United States Patent [19]

Gerold et al.

[11] Patent Number: 4,596,337

[45] Date of Patent: Jun. 24, 1986

[54] BEVERAGE VESSEL WITH HANDLE

[75] Inventors: Christian Gerold; Fritz John, both of Traunreut; Udo Leuschner, Traunwalchen; Alfons Zinsberger, Laufen, all of Fed. Rep. of Germany

[73] Assignee: Bosch-Siemens Hausgeräte GmbH, Stuttgart, Fed. Rep. of Germany

[21] Appl. No.: 498,960

[22] Filed: May 27, 1983

[30] Foreign Application Priority Data

May 27, 1982 [DE] Fed. Rep. of Germany ....... 3220057
Aug. 12, 1982 [DE] Fed. Rep. of Germany ....... 3230063

[51] Int. Cl.$^4$ .............................................. B65D 23/10
[52] U.S. Cl. ................................ 215/100 A; 403/265; 428/139
[58] Field of Search .................. 215/100 A, 1 R, 1 C; 403/265, 266, 267; 428/139, 140

[56] References Cited

U.S. PATENT DOCUMENTS

| 476,343 | 6/1892 | White | 215/1 R X |
| 1,278,270 | 9/1918 | Wilber | 428/139 |
| 3,076,223 | 2/1963 | Reichold | 215/100 A X |
| 3,224,629 | 12/1965 | Cummings | 215/1 C |
| 3,297,186 | 1/1967 | Wells | 215/100 A |
| 3,420,728 | 1/1969 | Haverstock | 428/139 X |
| 3,507,739 | 4/1970 | Jacobs | 428/139 |
| 4,004,774 | 1/1977 | Houston | 428/139 X |

FOREIGN PATENT DOCUMENTS

| 2400096 | 4/1979 | France | 403/265 |
| 976986 | 12/1964 | United Kingdom | 215/100 A |

Primary Examiner—Donald F. Norton
Attorney, Agent, or Firm—Herbert L. Lerner; Laurence A. Greenberg

[57] ABSTRACT

A beverage vessel, includes a receptacle formed of vitreous material, a handle, and a layer of adhesive material fastening said handle to said receptacle.

19 Claims, 14 Drawing Figures

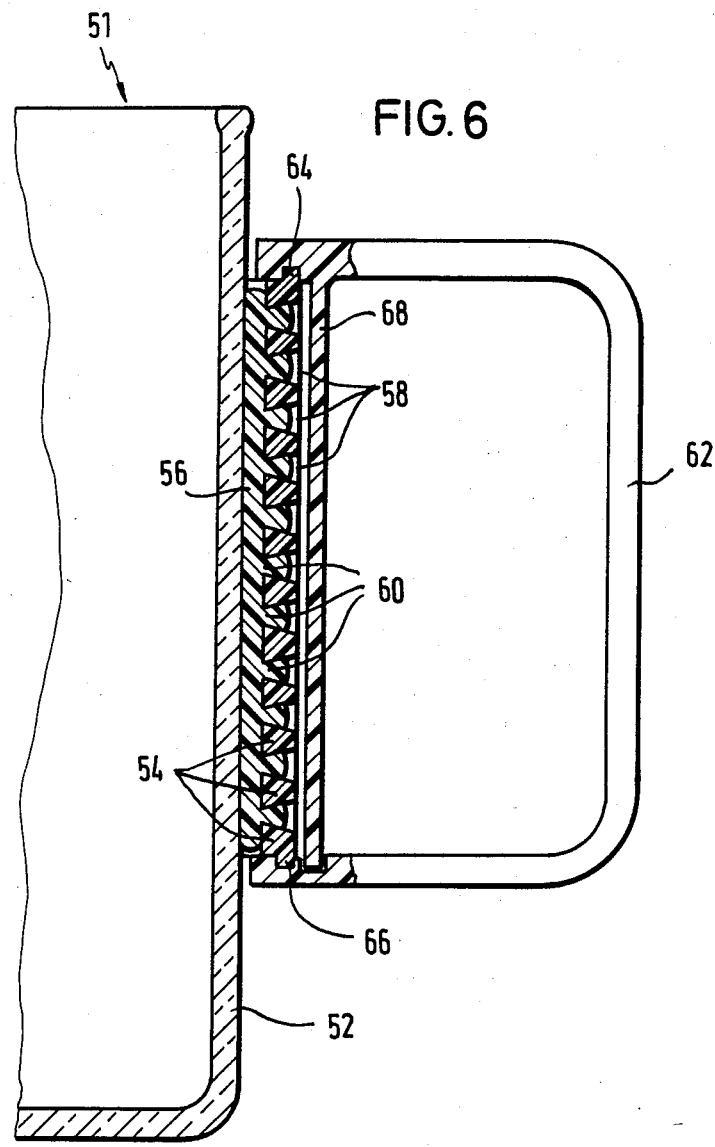

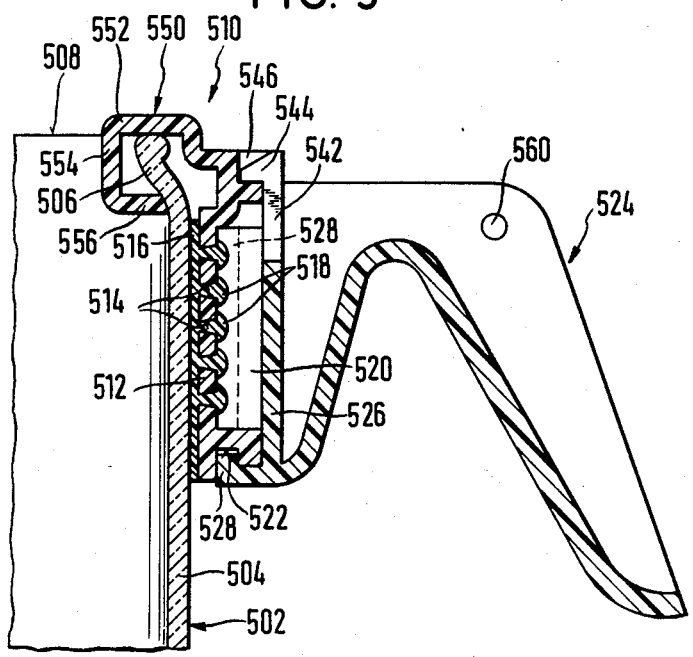

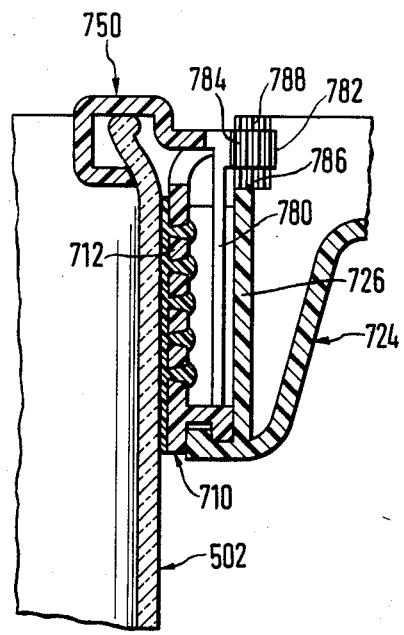
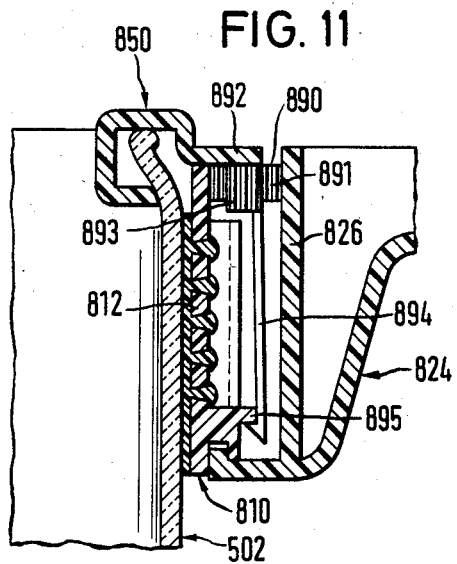

BEVERAGE VESSEL WITH HANDLE

The present invention relates to a beverage vessel, and has particular reference to a coffee pot or can of an electrical coffee machine.

In the conventional pots of this kind, handles, which may be made of plastic material, are fastened to the receptacle by means of steel tension bands. This has the disadvantage of requiring the fastening band to be occasionally retightened and it also forms deposit locations for foreign matter.

Pots of that type are also known, in which clasps formed from a resilient synthetic material on a handle partially encompass the receptacle or jar and retain the receptacle therebetween. These grips are relatively expensive and the fastening clasps again form deposit locations for foreign matter. Tension bands and resilient fastening clasps also have the disadvantage of not being particularly decorative and restricting the scope for shaping. In addition, glass pots with melted-on glass handles are known, but these are expensive and do not provide adequate thermal insulation.

It is accordingly an object of the invention to provide a beverage vessel which overcomes the hereinafore-mentioned disadvantages of the heretofore-known devices of this general type, and which provides a heat-insulating handle durably fastened to the receptacle or jar, with only slight production difficulties.

With the foregoing and other objects in view there is provided, in accordance with the invention, a beverage,vessel comprising a receptacle of vitreous material and a handle glued to the receptacle.

Preferably, the handle is formed of synthetic material, especially plastic material, and has a mounting surface which is permeated by ventilation channels, one end of each of which is open to a layer of adhesive matarial gluing the handle to the receptacle and the other end of each of which is open to the ambient air. As a result, it is possible to use an adhesive material having good adhesion to glass or porcelain, such as a one-component silicone adhesive, which requires the access of ambient air and moisture for hardening. With this construction, there is no longer a need to use a tension band requiring retightening and forming deposit locations for foreign matter. In addition, high demands are not made on the material of the handle, for example with respect to elasticity and strength.

Expiently, the handle has a cross piece extending between a grip opening thereof and a wall of the recepticle or jar, wherein the mounting surface is formed at this cross piece and the cross piece has ventilation channels formed therein in the form of passages which are open to the ambient air, at a surface of the cross piece facing away from the wall of the jar. In this manner, a large mounting surface is obtained as well as a finger protection for preventing contact with the hot wall of the jar. The openings of the ventilation channels facing away from the adhesive material layer can be concealed by a shield, defining a ventilation space open to the ambient air between the shield and the openings of the ventilation channels. Thus, for example, a second cross piece, which extends substantially parallel to the first cross piece and has dimensions which approximately correspond to use of the first cross piece in height and width, can be formed between the grip opening of the handle and the first cross piece, at a small spacing from the first cross piece, to act as a shield on the handle. The handle is preferably an injection-molded part of plastic material. In this manner, the handle can be constructed as an inexpensive injection-molded part with a shield formed integraly thereon.

The handle can also have a projection which rests on the upper rim of the jar and facilitates positioning of the handle during gluing. This projection can furthermore extend a short distance into the receptacle, so that the mutual engagement of the handle and jar is enhanced for the gluing operation and, in the case of a resilient hook-shaped projection, the handle is tightened against the jar in its upper region during the gluing operation.

If the handle is made from plastic material, there are advantages in cost and heat insulation. Suitable plastic materials are, for example, polypropylene and-thermoplastic polyester. However, adhesive substances, particularly silicone adhesives, do not have good adhesion to such plastic materials. This problem not only occurs with these plastic materials, but also to a greater or lesser extent with other plastic materials, since adhesive substances with good adhesion to glass or porcelain mostly adhere less well to plastic materials.

To overcome this difficulty, the adhesive material layer providing the adhesive connection may be connected to the jar by adhesion and to the handle by form-locking anchoring portions, which will be defined below. This construction can also be employed in the case of adhesive substances, which adhere adequately to plastic material, to increase the reliability of the connection.

The amount of adhesive material used can be such that it overflows from the free ends of the ventilation channels and forms heads at the exit points, which provide a form-locking anchoring. Anchoring also takes place when the adhesive material flowing from the free ends of the ventilation channels flows together to form a layer. The ventilation and hardening of the adhesive material layer between the jar and the handle is hardly impaired during this process. The ventilation channels can be provided with enlarged portions in direction toward their free ends, which preferably have a substantially conical shape. In this case, the anchoring is effected in the ventilation channels. In order to be able to produce ventilation channels of this kind in a simple manner, a separate fastening plate of plastic material can be glued to the jar, to which a handle portion can then be fastened, such as by a detent connection. The handle portion can have a cover for the free ends of the ventilation channels. In place of a fastening plate of plastic material, a fastening plate of glass or porcelain can be used, to which a handle of plastic material is then fastened. This construction has the advantage of permitting the jar to have a simple shape and to be easily made by machine, the adhesive connection being made between two parts of like or similar material so that the adhesive material can be matched optimally to this material. The separate fastening plate of glass or porcelain has substantially smaller dimensions than the glass jar and can thus be produced with relatively small tolerances, which facilitates the formation of the connection with the handle proper.

The partition of the handle has a whole series of advantages. In particular, a suitable plastic or another material can be used for the adhesive connection for the fastening element, while for the larger handle proper, a plastic material can be used, which fulfills other conditions. For example, the plastic material has to be low priced, decorative and easily cleaned. The jars are produced in a porcelain factory or in a glass factory and there they can also be supplied with a fastening element. The manufacturer of the jar, which usually supplies several coffee machine manufacturers with jars, can establish a particularly economic mass production. It is advantageous, for transporting the jar to the coffee machine manufacturer, for only the fastening element to be glued to the jar and not the entire bulky handle, which will first be attached to the jar during the assembly of the coffee machine.

If heat hardenable or curable adhesive substances, such as silicone rubber are used to provide a shorter hardening time, an additional problem ensues, which is that the plastic material does not stand undamaged during the use of temperatures in the range of 100° C. and higher for the fast hardening. Furthermore, at the connection point of the fastening element and the handle proper connected thereto, there is a demand for high accuracy as to size, i.e. smaller tolerances, in order to provide a reliable fixed connection between these parts. To solve these problems, it is suggested that the fastening element have a metal which preferably has a surface layer, having a good adhesive substance, such as silicone adhesive, and particularly heat hardenable or curable silicone rubber. Components of metal have the advantage of a larger temperature stability and a high degree of precision with relatively small production costs.

It is particularly advantageous to use a light metal alloy, such as an aluminum or magnesium alloy with and oxidized surface, whereby the oxides of the light metals have a chemical affinity with glass and porcelain, and therefore, the same adhesive substance has a good adhesion on both surfaces. Advantages also result in the additional use of a primer on the oxide layer, while the primer is adjusted to the adhesive, especially silicone rubber. Another advantage of the oxide layer, is that it has a greater thickness so as to be colorable, which can be very important, because the jar and the adhesive are mostly transparent and an optically pleasing appearance of the pot from the inside should also be obtained. It is also possible for a handle which is produced from a light metal as one piece, to be glued directly to the jar.

A segment of a profile strip, which may be made of aluminum and produced by an extrusion process, can serve as a fastening element. Before severing, the profile strip can be artifically oxidized, i.e. chemically or electro-chemically, or the oxidization can follow after severing. In this way, the surface of the cut is protected through the oxide layer and also may be colored. For example, for the handle of the coffee pot, a dark coffee brown is preferred.

An enamel coat can also serve as a surface layer and-/or the surface layer can be blasted with particles, for example, sand blasted, to increase the roughness and the gripping capacity for the adhesive. A plastic part covered with metal can also be used as a fastening element, which has the advantage of permitting the plastic material part to be produced very true to size at a low price. The additional oxidized metal cover can be very thin and the size accuracy is barely influenced.

It is particularly advantageous for the connection between the fastening element and the handle proper, if resilient connection elements are formed on the side of the jar facing away from the fastening element, for fastening the handle. In this case, the resilient qualities of the metal are immediately used and can create a tolerance equalization. There are also smaller demands made on the size accuracy of the parts and therefore a less expensive production of those parts is possible. The adhesive layer is already relatively thick and resilient. However, because of the elastic connection between the fastening element and the handle proper, an additional cushioning can be formed which protects the adhesive substance layer against abrupt, excessive stresses, and therefore contributes toward increasing the strength of the entire connection between the jar and the handle proper.

Furthermore, for economical production, the handle can have a separate fastening element, which is glued to the jar and connectible to the handle proper. Additionally, the fastening element has a hook projection which grips over the upper rim of the jar. The disposition of the hook projection at the fastening element has the advantage of guaranteeing a defined height of the fastening element relative to the upper rim of the pot. This is especially important, since mostly a swivelable pot cover is pivoted on the handle, and this pivotal position must have a defined height. Furthermore, the hook makes a special holding device unnecessary during the hardening time of the adhesive.

According to a first embodiment, the hook projection which grips over the upper edge of the jar can only be so long as to permit the hook projection to rest solely on the upper rim of the jar, while not extending into the interior of the jar. According to an advantageous construction, however, the hook projection is formed in such a way that the hook projection is angular in the interior of the jar a short distance downward and acts together with the inner wall of the jar. Thereby, the security of the adhesive connection is increased, while the hook transmits at least part of the force applied to the handle of the pot to the jar, especially when lifting a full jar, and therefore the adhesive connection is relieved which prevents the adhesive connection which otherwise would be especially heavily stressed from tearing at the upper end. Therefore, the hook projection is made relatively stiff, to be able to transmit the forces. However, the hook projection also preferably has a certain elasticity to equalize the form tolerances of the jar. The formation of the hook projection, which is angular in the interior, furthermore secures the jar against falling off the handle, in case the adhesive connection should be dissolved. In this way, damage due to a falling receptacle and especially due to spilling the contents of the jar, are avoided. For all these functions, it is particularly expedient if the hook projection of the fastening element grips around the top edge of the jar and grips outwardly with an end segment under an inwardly directed upper rim of the jar.

While the jars have relatively large tolerances, it can be advantageous if the hook projection of the fastening element is formed in such a way that it is movable crosswise, i.e. essentially in the direction normal to the wall of the pot, and is fixed in position either by the formation of the adhesive connection by means of the adhesive substance or by fastening the pot handle proper by means of the fastening element, in which case the hook projection with its part engaging the jar, lies on the inside of the wall of the jar. Through this tolerance equalization, breaking forces which act on the upper region of the adhesive connection, will be further reduced. For example, the detent hook can have a projection in vicinity of the pot handle proper, which has two opposite sides with a multiplicity of fine, approximately vertically extending grooves, which represent gearing.

On the pot handle proper, which is pushed into guides of the fastening element in vertical direction, a corresponding recess is provided for the mounting of this projection, which has a multiplicity of vertically extending ribs on opposite sides. The ribs interact with the vertical grooves, so that the grooves and ribs on the leading side are formed in such a way that during insertion, the ribs are inserted in suitably placed respective grooves. Alternatively, a similar toothed recess can be formed as well as the projection surrounding the fastening part. In this case, the ribs and grooves are not interlocked, but adhere wuth the adhesive glued on the jar, inserted between the projection and the recess in order to fix the position of the hook projection in place on the inner wall of the jar. According to another alternative development, the hook projection can also be formed as a separate part, which is lockable with the fastening projection. Devices of the above-described type are provided for tolerance equalization and fixing both parts takes place during respective attachment to a specific pot, to equalize tolerances thereof.

Furthermore, the advantage of dividing the handle into a fastening element and a handle proper, is that in case the jar breaks, the handle proper and the cover can be loosened and reconnected with a newly purchased jar including the glued on fastening element. Additionally, this division permits the formation of ventilation channels in the wall adjoining the adhesive substance layer in a simple manner by an injection-molding technique. The ventilation channels can be conical in direction away from the pot, and therefore the adhesive substance, which enters into channels, can form anchoring heads therein which maintain a form-locking connection if the adhesive substance layer detaches from the adhesive surface of the fastening element. The inserted handle proper then preferably includes a cover for the free ends of the ventilation channels to give a decorative overall appearance to the pot.

The handle proper preferably has substantially vertically extending guideways and is inserted from below in vertical extending guideways on the fastening element. In this way, the sliding movement on the bearing surfaces of the handle proper and the fastening element, is limited to a certain height, to obtain a defined height of the pivotal position for the cover of the pot. The guideways or guides can also be dovetailed and inclined wedge-shaped across the sliding direction. The advantage of inserting the handle from below, is that when lifting a filled jar by means of the handle, forces occur which act between the handle proper and the fastening element in the direction of the establishment of the connection, and therefore the danger of accidents is reduced. Preferably, on the handle proper and/or on the fastening element, a detent device is disposed, which is engaged in the uppermost position of the handle proper, in order to prevent a downward pulling of the handle proper. The detent device can have a manual unlocking projection with a workable detachment, so that a user can connect a new pot to the handle proper. This manual unlocking projection is preferably disposed in such a way that accessibility is made difficult for security reasons.

Other features which are considered as characteristic for the invention are set forth in the appended claims.

Although the invention is illustrated and described herein as embodied in a beverage vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 6 is a fragmentary, partly cross-sectional, side-elevational view of a beverage vessel according to a third embodiment of the invention;

FIG. 9 is a fragmentary, vertical sectional view of the receptacle as connected with the fastening element and the handle proper, taken along the line IX—IX in FIGS. 7 and 8, in the direction of the arrows;

FIG. 10 is a fragmentary cross-sectional view according to a modified embodiment of FIG. 9;

FIG. 11 is a view similar to FIG. 9, of the receptacle in connection with an alternative ambodiment of the fastening element;

Figure 1:
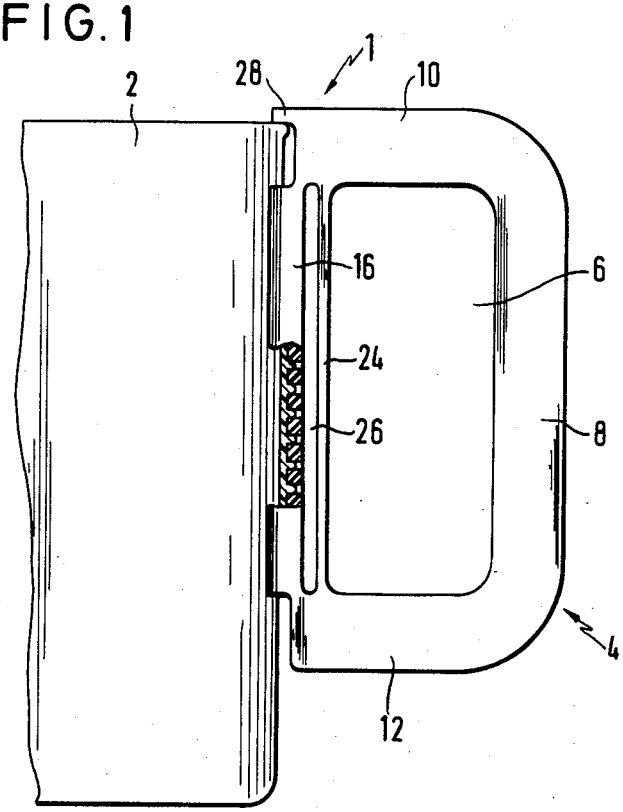
FIG. 1 is a fragmentary, diagrammatic, partly cross-sectional side-elevational view of part of a beverage vessel according to a first embodiment of the invention.
Figure 2:
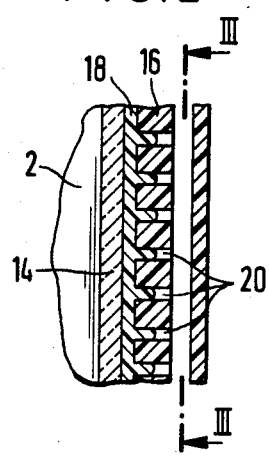
FIG. 2 is a fragmentary, detailed view on an enlarged scale, of the sectioned part of FIG. 1.
Figure 3:
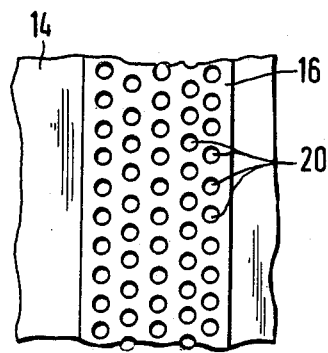
FIG. 3 is a side-elevational view taken substantially along the line III—III of FIG. 2, in the direction of the arrows.

Referring now to the figures of the drawings in detail, and first particularly to FIGS. 1-3 thereof, there is shown a coffee pot 1 of an electric coffee machine, including a glass jar 2 to which a substantially rectangular, annular handle 4, which has a grip opening 6, is fastened by gluing.

The handle 4 has a vertical cross piece 8, which faces away from a receptacle or jar 2 and forms a grip element or handle. An upper arm 10 and a lower arm 12 extend from the cross piece 8 toward a vertical wall 14 of the jar 2 and end shortly before the vertical wall. The arms 10 and 12 are connected with each other by a vertical cross piece 16, which extnds along the wall 14 of the jar 2, projects towards the jar relative to the arms 10 and 12 and is connected with the wall 14 by a layer 18 of a single component silicone adhesive substance. The width of the cross piece 16 horizontal direction along the wall 14 is substantially greater than its thickness. The cross piece 16 is permeated by ventilation channels 20 in the form of passage openings, which on one hand are open to the adhesive layer substance and on the other hand are open to the ambient air at the side facing away from the wall 14. As a result, a more rapid and reliable hardening of the single-component adhesive substance is ensured over the entire surface of the adhesive substance layer. Fifteen ventilation channels 20 are formed in the cross piece 16 per square centimeter of the adhesion surface or adhesive substance layer.

A second cross piece or cover portion 24 which interconnects the arms 10 and 12 and is disposed as a shield in front of the openings of the ventilation channels 20, extends parallel to the cross piece 16 along the side thereof facing away from the wall 14. The cross piece 16 and 24 are spaced apart from each other by a distance 26, so that a ventilation space is formed providing access for air to the openings of th channels 20. The adhesive substance enters over a short distance into the ventilation channels 20 from the adhesive substance layer 18. If so desired, the adhesive can completely fill the ventilation channels so that dirt cannot enter the channels. The channels in this case also fulfill their purpose of creating many connections between the adhesive substance layer 18 and the ambient air.

The upper arm 10 of the handle 4 has a projection 28 as an extension of its upper surface in direction towards the jar 2, which rests on the upper rim of the jar for positioning purposes.

Figure 4:
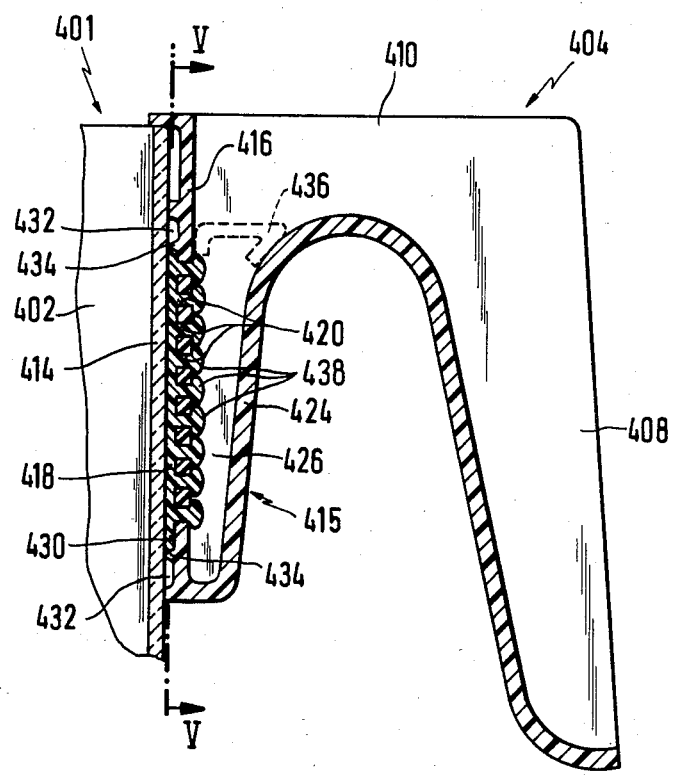
FIG. 4 is a fragmentary; partly cross-sectional, elevational view of part of a beverage vessel according to a second embodiment of the invention.
Figure 5:
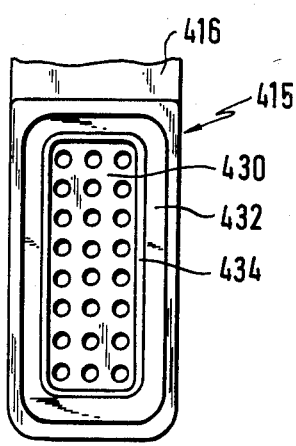
FIG. 5 is a side-elevational view taken substantially along the line V—V of FIG. 4 in the direction of the arrows, wherein a layer of adhesive substance is omitted.

In FIGS. 4 and 5 there is shown a coffee pot 401 which includes a glass receptacle or jar 402 to which a handle 404 is fastened by gluing. The handle is particularly easy to remove from a mold as an injection-molded part of plastic material. The handle 404 has a cross piece 408, which faces away from the jar 402, extends obliquely downward, forms a hand grip and is connected through an upper, upwardly open, U-shaped cross piece 410 with an arm 415 extending substantially vertically along the wall of the jar 402. The arm 415 has a vertical cross piece 416 extending along the glass jar, with a flat recess 430 reteiving an adhesive substance layer 418. The cross piece 416 is permeated by ventilation channels 420 in vicinity of the recess 430, four channels per square centimeter of the adhesion surface being provided. The channels 420 extend perpendicularly to a wall 414 of the jar 402 in vicinity of the adhesion surface. The recess 430 is surrounded by a flat gutter 432 and is separated from the gutter by a narrow cross piece 434. The gutter 432 serves to receive any adhesive substance over flowing laterally from the recess 430, so that adhesive substance cannot flow laterally between the handle 404 and the wall 414 of the jar, which would disturb the decorative appearance. The arm 415 has a slightly inclined cross piece 424, which is disposed at a distance from the vertical cross piece 416, covers the vertical cross piece 416 and forms a dowenardly closed blind hole 426 with withdrawal ramps for an injection-molding tool, together with the cross piece 416. The handle 404, which as a whole is bowl-shaped, can be closed off upwardly and at the side facing away from the jar by a cover part. Alternatively, a closure element 436, shown in broken lines in FIG. 4, can close off the hole 426 in the vertical arm 415, the closure either being permeable to air or else being mounted only after complete hardening of the adhesive substance layer has taken place.

The quantity of the adhesive substance forming the layer 418 is such that it completely fills the ventilation channels 420 and overflows at the free end thereof so as to form a thickened head 438. The heads 438 represent a form-locking anchoring of the adhesive substance layer at the cross piece 416, which has the effect of ensuring that an adequate connection is provided even if the adhesion of the adhesive substance to the plastic material of the cross piece 416 is broken. A form-locking connection is a connection that is formed by the shape of the parts themselves, requiring no other locking device.

In the embodiment shown in FIG. 6, a glass jar or receptacle 51 is provided with a vertical side wall 52, to which a fastening plate 54 is glued by means of a layer 56 of a silicone adhesive substance. The plate 54 has a large number of ventilation channels 58 formed therein, which permeate the plate 54 horizontally. Each of the channels 58 are enlarged conically towards their free end facing away from the adhesive substance layer 56. The quantity of the adhesive substance is such that the ventilation channels 58 are largely filled, the adhesive substance forming a conical anchoring head 60 in each ventilation channel. A handle portion 62 of plastic material is fastened to the upper and lower ends of the fastening plate 54 by detent lugs 64 and 66. The handle portion 62 has a cover piece 68, which extends parallel to the plate 54 and covers the openings of the channels 58.

A possible modification of the embodiment according to FIG. 6 is to use a glass fastening plate in place of the fastening plate 54 formed of plastic material. The fastening plate otherwise has the same shape as the plate 54. The handle portion is formed of plastic material just as before, and is connected by detent means with the glass fastening plate.

Figure 8:
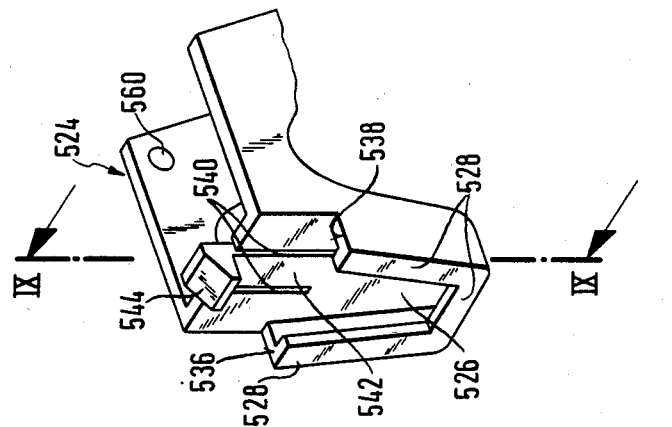
FIG. 8 is a fragmentary perspective view of the handle proper, which is connectible with the receptacle according to FIG. 7.
Figure 7:
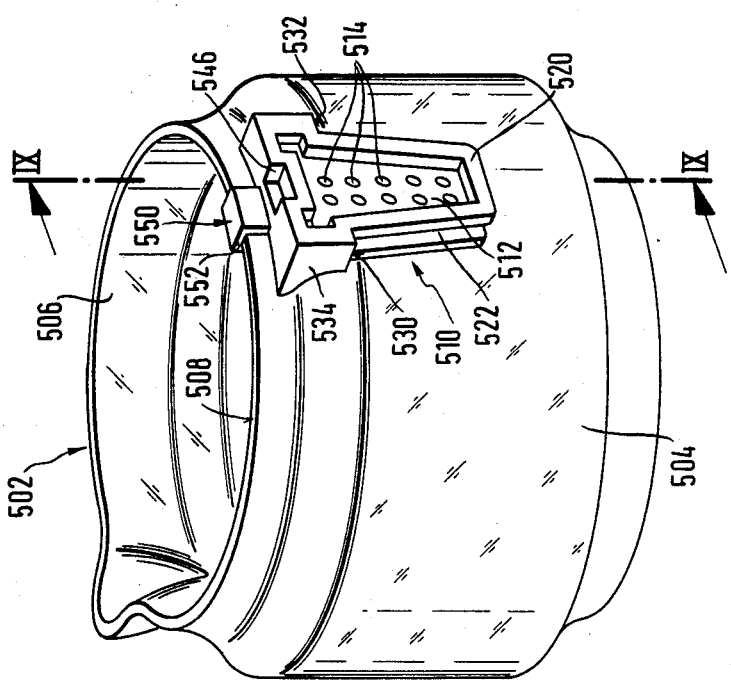
FIG. 7 is a perspective view of a receptacle with a glued on fastening projection according to a modified embodiment of the invention.

The embodiment according to FIGS. 7-9 includes a jar or receptacle 502 made of glass with a cylindrical wall segment 504, which adjoins an inwardly bent upper rim segment 506 with an upper rim 508. A fastening element 510 is provided with an adhesive wall 512, which extends parallel to the cylindrical wall segment 504 of the jar 502, and which is permeated by ventilation channels 514, which are conically extended from the jar 502. This adhesive wall 512 is glued to the cylindrical wall segment 504 of the jar 502 by an adhesive substance layer 516. The adhesive substance overflows through the ventilation channels 514 and forms heads 518 at its free ends. The adhesive wall 512 follows the curvature of the jar 502 and a frame 520 protrudes from the outer rim of the wall 512, away from the wall of the jar. The outer side wall of the frame 520 on the underside thereof and on the lower three-quarters of the height thereof has guideways in the form of grooves 522, which are situated in a vertically disposed plane. A handle proper 524 is provided, which includes a cover wall 426 facing toward the fastening part 510 that covers the ventilation channel 514 in the mounted condition. The cross section of FIG. 9 illustrates that a hook-shaped guide projection 528 projects from the cover wall 526 over the lower three-quarters of the height of the fastening part 510, in order to form a frame-shaped guide, that acts together with the guide grooves 522 on the fastening part. The frame 520 of the fastening part as well as the guide projection 528 of the handle proper diverge upwardly to form V-shapes. This permits the mounting to be made more easily, while smaller frictional forces exist during insertion and only at the last moment is a fixed fit obtained. The frame 520 of the fastening element extends at the upper region thereof with steps 530 and 532 to an upper cross head 534. Upper ends 536 and 538 of the guide projections 528 are disposed against the steps 530, 532. A spring tongue 542 is formed by vertically extended slot-shaped breakthroughs 540 in the cover wall 526 of the handle proper 524. The tongue 542 carries a detent hook 544 at the upper end thereof, which is movable in direction normal to the cylindrical wall 504 of the jar. In the highest position of the handle proper 524, the detent hook 544 is locked in a recess 546 formed in the uppermost part of the frame 520, in the cross head 534. The detent hook 544 is disposed in such a way as to be protected against inadvertent loosening in the recess 546; on the other hand, it is placed so favorably that the detent hook can be consciously seized and unlocked from the jar for the deliberate loosening of the handle proper.

A hook projection 550, which is made of plastic material in one piece with the fastening element, extends with an upper horizontal segment 552 thereof from the cross head 534 of the frame 520 of the fastening element 510. The horizontal segment 552 lies on the upper rim 508 of the receptacle 502. A vertical hook segment 554 is attached to the horizontal segment 552 and extends, at a distance from the upper rim 508 of the jar, downward into the jar. Again, a horizontal outwardly leading end segment 556 is attached to the hook segment 554. The end segment 556 is attached with its free end at the inner wall of the jar in vicinity of the inwardly leading upper rim segment 506. On one hand, the hook projection 550 is made so stiff that it can transmit a considerable portion of the forces which occur from carrying a full jar by means of the handle. However, on the other hand, the hook projection 550 possesses a certain elasticity to equalize the form or contour tolerances of the jar 502. Furthermore, the handle proper 524 also has a joint depression 560 for locking a pot cover.

FIG. 10 illustrates a modification of the embodiment according to FIGS. 4-6, wherein the jar 502 is identical and therefore has been given the same reference numeral. A fastening element 710 is glued onto the jar 502 and is connected with a handle proper 724 by means of sliding connections in a manner similar to the embodiment according to FIGS. 4-6. A hook projection 750 and the fastening element 710 are made of plastic material in one piece, and correspond to the hook projection 450 with the segments extending over and into the jar. However, the end of the projection 750 facing away from the jar is connected with an end of a vertically extended flexible or resilient rod 780, which leads downward behind an adhesive wall 712 of the fastening element 710. The lower end of the rod 780 is connected with the lower region of the fastening element. At the connection location between the hook projection 750 and the flexible rod 780, a locking projection 782 is formed. The projection 782 projects horizontally away from the pot and has gearing 784 formed of teeth extending vertically crosswise to the laterally extending surfaces of the wall of the pot. The handle proper 724 includes a cover wall 726, which extends substantially parallel to the wall of the pot and which has an upper recess 786, which has gearing 788 extended crosswise to both lateral surfaces of the pot. The gearing 788 and 784 at both sides of the locking projection 782 of the hook projection 750 interact as soon as the handle proper 724 is attached to the fastening element 710 from below. The flexible rod 780 has a light initial stress, which pulls the hook projection 750 outward, and pulls its inner end segment against the pot wall. By pushing on the handle proper 724, this position is fixed in place on the inner wall of the jar 502. In this manner, the relatively large contour tolerances in the jar 502 are equalized, which causes the hook projection 750 to immediately fulfill its tension relief function by lifting up the jar by means of the handle, and the adhesive connection in its upper region does not have to take up all the tension. The locking of the handle proper 724 on the fastening element 710 takes place in a manner similar to the embodiment according to FIGS. 4-6. Therefore, respective detent hooks which are formed on both sides at a distance from the upper rim recess 786, act together with the upper rim region of the fastening element 710. For simplification of the drawing, the detent hooks are not shown.

FIG. 11 shows another modification of the embodiment according to FIGS. 4-6, wherein a fastening projection 810 glued on to the recetacle 502 is formed without a hook projection. A handle proper 824 is connected by sliding guideways and includes a substantially vertically extending cover wall 826 for the covering ventilation channels formed in an adhesive wall 812 of the fastening element 810. A horizontal cover wall 890 extends in direction away from the pot from the upper end of the adhesive wall 812 to the cover wall 826. This cover wall 890 has a recess 891 in the middle region thereof, which extends from the free ends of the cover wall 890 to the adhesive wall 812, crosswise to the wall of the coffee pot. Mutually oppositely extending lateral walls, have a gearing with vertically extending teeth, or ribs and grooves, respectively. A hook projection 850, which is formed as a separate plastic part, is formed similar to the hook projection 550 in the part thereof which is placed over the upper rim of the pot and which extends into the pot. However, at the end thereof facing away from the pot, the hook projection 850 is not formed as one piece with the fastening element 810, but has a horizontally extending guide segment 892, which rests on the cover wall 890 of the fastening element 810. A locking pin 893, having a rectangular cross section, protrudes downward into the recess 891 of the cover wall 890, from the flat guide segment 892. The locking pin 893 has gearing crosswise to the wall of the pot in the lateral walls of the fastening region. The gearing is meshed on both sides in the gearing of the recess 890, and therefore is secured against displacement toward or away from the jar. An elongated resilient detent hook 894 is formed at the lower end of the locking pin 893. The hook 894 grips under a detent projection 895, which is formed in the lower region of the fastening element 810. When gluing the fastening element 810 to the jar 502, the hook projection 850 is first placed in its operating position over the upper rim of the receptacle 502, so that the inner end segment of the hook projection lies on the inner wall of the receptacle 502. Then the fastening element 810 without any adhesive substance is pushed from below along the outer wall of the jar until the locking pin 893 sits in the recess 890 and the hook projection 894 is locked. The fastenng element 810 and the hook projection 850 now form a set unit, which can be swung away from the wall of the jar for reapplying the adhesive substance. It should be mentioned, that non-illustrated outer spacing ribs are disposed on the adhesive wall 812, which laterally limit the adhesive substance layer and which, during the above-described adjustment of the adhesive substance, consider and prevent adhesive substance layers of different thickness from making an exact adjustment illusive. In this case, the locking of the handle proper 824 on the fastening element 810 can take place through the detent hooks formed in the cover wall 826. The hooks act together with the cover wall 890 toward the right and left of the recess 891 and a recess in the cover wall. This detent installment is omitted from the drawing for simplification thereof.

As a modification of the embodiment according to FIG. 11, the recess 891 in the cover wall 890 of the fastening element 810, which is furnished with the lateral gearing, could be made slightly wider so that the gearing thereof does not mesh with the gearing of the locking pin 893 of the hook projection 850. In this case, the fastening takes place by applying the adhesive substance between the locking pin and the two side walls of the recess 891, respectively. This permits a refined adjustment of the assigned gearing in the case of the embodiment according to FIG. 11. In this modified embodiment, the gearing can be totally or partially omitted, so that the movability is facilitated for positioning. It is also possible to drill a ventilation channel in the adhesive wall, so that the overflowing adhesive substance influences the fastening of the hook projection in the set position.

The fastening element can be produced from material other than plastic, which is suitable for gluing with glass or porcelain. For example, glass, porcelain or another material, which is furnished with a coating that glues well with glass or porcelain, may be used.

Figures 12, 13, 14:
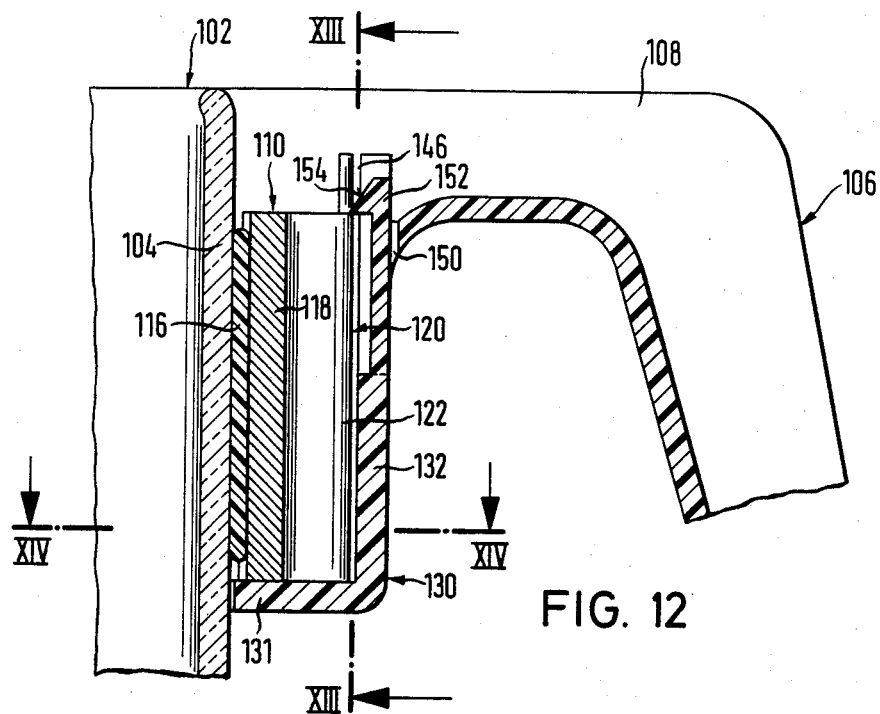
FIG. 12 is a view similar to FIG. 4, of a modified embodiment of the device, taken essentially along the line XII—XII in FIG. 14 in the direction of the arrows.
FIG. 13 is a fragmentary cross-sectional view, taken essentially along the line XIII—XIII in FIG. 12 in the direction of the arrows.
FIG. 14 is a fragmentary cross-sectional view, taken essentially along the line XIV—XIV in FIGS. 12 and 13, in the direction of the arrows.

In the embodiment represented in FIGS. 12–14, a glass jar 102 is provided with a vertical side wall 104 connected with a bowl-shaped handle 106, made of plastic material. The handle 106 has a handle proper 108, which is connected with a fastening element 110 that is glued onto the receptacle 102 through a sliding and detent connection. The fastening element 110 is formed of electrolytically oxidized aluminum and has a fastening plate 112, extending concentrically to the wall 104. The plate 112 has vertically projecting rim segments 114 disposed against the wall of the pot, which prevent lateral expansion of an adhesive substance layer 116 between the receptacle wall 104 and the fastening plate 112. The upper and lower rim of the fastening plate 112 does not have a cross piece projecting to the jar, because in this case the fastening element 110 is a segment, which is an aluminum profile produced in an extrusion process or in a continuous casting process. After being cut off from a rod-shaped profile, the fastening element 110 is electrolytically oxidized, to give it a good all-around protection for corrosion and to provide good adhesion for the adhesive to the oxide layer, which has an affinity to the glass. The adhesive is in the form of a heat curable or hardenable silicone rubber. As a modification of this embodiment, the artificial oxidation can also be carried out before the severing of the extrusion profile. It could also be sufficient if substantially only the surface assigned to the receptacle, which is in contact with the adhesive substance, is oxidized and eventually colored. The other surfaces are still protected relatively well against corrosion by the oxide layer, which is formed little by little by itself.

The fastening plate 112 has a thickening 118 in its middle region over the total height of the side thereof facing away from the jar 102. The plate 112 likewise has cross pieces 120, which extend over the entire height and are horizontally spaced apart from each other. The cross pieces 120 extend in a meander-shaped wavy form, as seen in the plan view of FIG. 14. The cross pieces 120 first extend away from the thickening 118 at a right angle to the fastening plate 112. The cross pieces then have a curve 122 extended along the thickening 118 until the cross pieces are a short distance from the thickening 118. Eventually, another curve 124 extends away from the thickening 118 at a right angle to the fastening plate 112, and finally the cross pieces have outward angled rim regions 126, which extend parallel to the fastening plate. The handle proper 108 has an upwardly open fastening bowl 130, which extends vertically along the wall of the jar 104 and has a closed bottom 131, and a back wall 132 which extends parallel to the wall of the jar. Side walls 134 and 136 extend laterally in the direction of the wall 104 of the jar from the back wall 132. The walls are connected with the bottom wall 131, and as with the bottom wall 131, end at a distance from the wall 104 of the jar, to permit elastic movement of the handle proper 108 relative to the receptacle 102. As shown in FIGS. 13 and 14, in the edge region between the back wall 132 and the side walls 134 and 136, respectively, the fastening bowl 130 has an inner thickening which extends from below over the greater part of the height. Grooves 140 and 142 for holding the outer end segments 126 of the cross pieces 120 of the fastening element 110, are formed in the thickening. As shown particularly in FIG. 13, the grooves 140 and 142 extend laterally outward, parallel to the wall 104 of the jar. The bottoms of these grooves, which act together with the outer ends of the cross pieces 120, are disposed at a slightly downwardly conically decreasing distance from each other. The bottoms of the uppermost end segments 144 and 146 of the grooves 140 and 142 join the bottoms of the grooves 140 and 142 and greatly separate upwardly from the bottoms, to serve as insertion segments for the cross pieces 120 of the fastening element 110 during the mounting of the handle proper 108. By pushing on the handle proper 108 from below onto the fastening element 110, which is glued onto the receptacle 102, the cross pieces 120 of the fastening element are pressed together elastically in the insertion grooves 144 and 146. In their end position in the grooves 140 and 142, the cross pieces 120 have a permanent elastic outward prestress into the grooves 140 and 142, which increases from the top downward because of the conicity of the spacing between the grooves. According to a modified embodiment, the grooves 140 and 142 may extend parallel to each other so that the elastic initial stress is the same over the entire height of the fastening element. The finished tolerances are equalized and the elasticity of the connectionis increased, by the elasticity of the cross pieces 120. This positively works out abrupt stresses, while the maximum stresses of the adhesive substance layer 116 are decreased.

In the back wall 132 of the fastening bowl 130, is a resilient detent hook 152, which passes through a vertical slot-shaped breakthrough 150 from the top, over a part of the height. The detent hook 152 has an upwardly sloped nose 154, which is engaged over the curves 122 of the cross pieces 120 of the fastening elements 110. If the handle proper 108 is pushed fully upward, it thereby provides additional security against the danger of pulling off the handle downward. Mainly, however the loosening of the connection is prevented by the friction of the cross pieces 120 in the grooves 140 and 142.

When the adhesive substance layer is hardened by temperatures around 100° C., the oxide layer of the light metal, i.e. the chemically or electrolytically produced oxide layer of aluminum, can develop cracks. However, this is harmless, since the cracks in the surface layer are not extended parallel, but are rather crosswise, to the surface, so that the durability of the oxide layer on the metal base will not be decreased, or will only be decreased by an inconsequential amount. This crack formation acts positively rather than negatively on the adhesion of the adhesive substance layer on the oxide layer.

The question as to which process will be used for the formation of a suitable surface layer, depends on the material used for the fastening element. For example, sand blasting, etching, or galvanic or conductive application of different coatings, may be used. However, in the present case, a surface layer made of a light metal oxide either on a fastening element made of light metal or another material, which is coated with light metal, is of particular advantage. Through the similarity of the light metal oxide to glass porcelain or similar mineral melting materials, when a primer is used for gluing, the same primer can be used for the fastening element and for the adhesive surface on the jar, and can be put onto both positions of the receptacle and the fastening element to be glued subsequently, thereby simplifying the production.

We claim:

1. Beverage vessel, comprising a receptacle formed of vitreous material selected from the group consisting of glass and ceramic, a handle having a grip opening formed therein, and a layer of adhesive material fastening said handle to said receptacle, said handle having a mounting surface having a plurality of ventilation openings formed therein, said openings having an end communicating with said layer of adhesive material fastening said handle to said receptacle and another end communicating with the ambient air, and said handle having a cover portion spaced between said grip opening and said other ends of said ventilation openings in said mounting surface facing away from said adhesive material layer, defining a ventilation space communicating with the ambient air.

2. Vessel according to claim 1, wherein said handle is injectionmolded from plastic material.

3. Vessel according to claim 1, wherein said handle has a mounting portion on which said mounting surface is disposed and a hand grip portion in which said grip opening is formed being separate from said mounting portion and being fastened to said mounting portion.

4. Vessel according to claim 3, wherein said mounting portion is formed of vitreous material.

5. Vessel according to claim 3, wherein said receptacle has an upper rim, and said mounting portion has a hook-shaped projection engaging over said upper rim.

6. Vessel according to claim 5, including means for fastening said hook-shaped projection to said mounting portion in an adjusted position.

7. Vessel according to claim 6, including means for fastening said book-shaped projection to said hand grip portion.

8. Vessel according to claim 3, wherein said hand grip portion includes first substantially vertically extended guideways and bearing surfaces, and said mounting portion includes second substantially vertically extended guideways and bearing surfaces, said first guideways being inserted from below into said second guideways for fastening up to a given height limited by mutual contact between said bearing surfaces.

9. Beverage vessel, comprising a receptacle having a wall, said receptacle being formed of vitreous material selected from the group consisting of glass and ceramic, a handle having a grip cutout formed therein defining a first cross piece integral with said handle having a mounting surface facing toward said wall of said receptacle and another surface facing away from said wall of said receptacle and toward said grip cutout, a layer of adhesive material fastening said mounting surface of said first cross piece to said wall of said receptacle, said first cross piece having ventilation openings formed therein with an end communicating with said layer of adhesive material at said mounting surface thereof and another end communicating with the ambient air at said other surface thereof, and said handle having a second cross piece being substantially parallel to said first cross piece and being disposed between said first cross piece and said grip cutout covering said other ends of said ventilation openings.

10. Vessel according to 9, wherein said plurality of ventilation openings are in the form of substantially 2 to 25 ventilation openings formed in said mounting surface per square centimeter of surface area thereof.

11. Vessel according to claim 9, wherein said plurality of ventilation openings are in the form of substantially 4 to 15 ventilation openings formed in said mounting surface per square centimeter of surface area thereof.

12. Beverage vessel, comprising a receptacle formed of vitreous material having a rim at the uppermost horizontal surface of said receptacle, a handle having a projection bearing on said uppermost horizontal surface of said rim of said receptacle from above, and a layer of adhesive material fastening said handle to said receptacle.

13. Vessel according to claim 12, wherein the projection is hook-shaped and engages around said rim of said receptacle.

14. Vessel according to claim 13, wherein said receptacle has a wall, and said handle has an upper portion resiliently pulling against said wall of said receptacle.

15. Vessel according to claim 13, wherein said handle includes a remaining portion besides said hook-shaped projection, said hook-shaped projection is separate from said remaining portion of said handle and has a first locking element disposed thereon, and said remaining portion of said handle has a second locking element disposed thereon being connectible to said first locking element in different positions.

16. Vessel according to claim 15, wherein said locking elements are gears.

17. Vessel according to claim 12, wherein said receptacle has a wall having said rim and an inner surface, and said projection is hook-shaped and has an end segment gripping said inner surface of said receptacle wall.

18. Vessel according to claim 17, wherein said rim of said receptacle wall has an inwardly bent upper segment, and said end segment of said hook-shaped projection grips said inner surface of said receptacle wall under said inwardly bent upper segment.

19. Vessel according to claim 17, including means for adjusting said hook-shaped projection in position relative to the remainder of said handle in a direction substantially perpendicular to said receptacle wall, and means for locking said hook-shaped projection in siad adjusted position.

* * * * *